United States Patent
Raddin

(10) Patent No.: US 7,347,438 B2
(45) Date of Patent: Mar. 25, 2008

(54) CYCLE BRACKET HAVING MULTIPLE DROP-OUTS

(76) Inventor: James C. Raddin, 897 Highpoint Dr., Springboro, OH (US) 45066

(*) Notice: Subject to any disclaimer, the term of this patent is extended or adjusted under 35 U.S.C. 154(b) by 349 days.

(21) Appl. No.: 11/162,818

(22) Filed: Sep. 23, 2005

(65) Prior Publication Data

US 2007/0069498 A1    Mar. 29, 2007

(51) Int. Cl.
*B62K 19/18* (2006.01)
*B62K 19/34* (2006.01)

(52) U.S. Cl. .................. 280/279; 280/281.1; 280/288; 280/274; 280/284; 280/276; 280/278; 280/287; D12/117; D12/111; 301/125

(58) Field of Classification Search ................ 280/279, 280/281.1, 288, 274, 284, 276, 278; D12/111, D12/117; 301/125
See application file for complete search history.

(56) References Cited

U.S. PATENT DOCUMENTS

| | | | |
|---|---|---|---|
| 2,894,762 A | * | 7/1959 | Randel .................... 280/281.1 |
| 3,894,751 A | * | 7/1975 | Fuhrman et al. ............ 280/279 |
| 3,966,230 A | * | 6/1976 | Nicol ....................... 280/281.1 |
| 4,565,383 A | | 1/1986 | Isaac .......................... 280/276 |
| 4,813,591 A | | 3/1989 | Mueller et al. .......... 228/173.4 |
| 5,121,973 A | * | 6/1992 | Phillips ................... 301/110.5 |
| 5,165,762 A | * | 11/1992 | Phillips ................... 301/110.5 |
| 5,292,143 A | | 3/1994 | Stauch et al. ............... 280/279 |
| 5,692,764 A | | 12/1997 | Klein et al. ................. 280/279 |
| 5,813,685 A | | 9/1998 | LaRiviere ................... 280/279 |
| 6,669,218 B1 | | 12/2003 | Sinyard et al. ............. 280/274 |

FOREIGN PATENT DOCUMENTS

JP       06048356 A  *  2/1994

\* cited by examiner

*Primary Examiner*—Paul N. Dickson
*Assistant Examiner*—Marlon Arce-Diaz
(74) *Attorney, Agent, or Firm*—Lafkas Patent LLC; David M. Lafkas

(57) ABSTRACT

The present invention includes a front fork assembly for a cycle. The assembly includes a steering tube, front furcations fixed to the steering tube, and a drop-out bracket device fixed to a distal end of each front furcation. The drop-out bracket device has a tubular member having multiple drop-out brackets directed towards a front side of the cycle, a back side of the cycle, or both. Each drop-out bracket has a substantially planar fastening member and an opening.

18 Claims, 5 Drawing Sheets

CYCLE BRACKET HAVING MULTIPLE DROP-OUTS

BACKGROUND

The present invention relates generally to multi-wheeled cycles, and more particularly, to a multiple drop-out bracket device for modifying the riding performance, potential speed, and stability of a multi-wheeled cycle.

Typically, front and rear axles of a typical multi-wheeled cycle, such as, for example, bicycles and tricycles, are attached to the front fork and frame, respectively, of the multi-wheeled cycle. In particular, the axles are retained in slotted elements called "drop-outs" which are welded to receiving tubes of the front fork and frame, respectively.

Various types of drop-outs may be found in bicycle frames. An exemplary, and typical drop-out is represented in FIG. 1, wherein a flat front axle dropout 20 has been inserted into the center of the end of the receiving tube 10. That end of the receiving tube is then worked to form dome-like transitions 12 between the cylindrical shape of the receiving tube and the flat sides of the dropout 20.

Another variation is seen in FIG. 2, wherein a front fork of a bicycle is depicted and the drop-outs 20 are shown at the distal end 36 of the furcations 25 of the bicycle front fork.

Although various modifications have been proposed in methods of attaching drop-outs to bicycles, each proposed method or variation of drop-outs provides for only one position for attachment of a wheel to the drop-outs. That is, as shown in FIG. 2, the prior art sets forth merely one drop-out at each distal end of a bicycle fork furcation.

Having merely a single drop-out at the distal end of a bicycle fork furcation limits the ability of an individual to modify the performance, steering, speed, etc. of the bicycle without costly equipment changes such as, for example, and entire new front fork. Further, such costly equipment changes may also have high related service charges for removing old equipment and attaching new equipment.

Thus, what is desired is a simple and cost-effective means to permit an individual to alter the placement of a wheel on a multi-wheeled cycle in order to modify the performance, speed, steering, or combination thereof of the cycle.

SUMMARY

The various exemplary embodiments of the present invention include a front fork assembly for a cycle having at least two wheels. The assembly comprises a steering tube, front furcations fixed to the steering tube, and a drop-out bracket device fixed to a distal end of each front furcation. The drop-out bracket device comprises a tubular member having at least two drop-out brackets directed towards a front side of the cycle, a back side of the cycle, or a combination of both. Each drop-out bracket comprises a substantially planar fastening member and an opening.

The various exemplary embodiments further comprise a drop-out bracket device for retaining an axle of a multi-wheeled cycle. The drop-out bracket device comprises a tubular member having at least two drop-outs directed towards a front side of the cycle, a back side of the cycle, or a combination of both. Each drop-out comprises a substantially planar fastening member and an opening.

BRIEF DESCRIPTION OF DRAWINGS

The various exemplary embodiments of the present invention, which will become more apparent as the description proceeds, are described in the following detailed description in conjunction with the accompanying drawings, in which.

DETAILED DESCRIPTION

The various exemplary embodiments of the present invention comprise a drop-out bracket device comprising multiple drop-out brackets for reception and attachment of a related axle and wheel.

Figure 1:
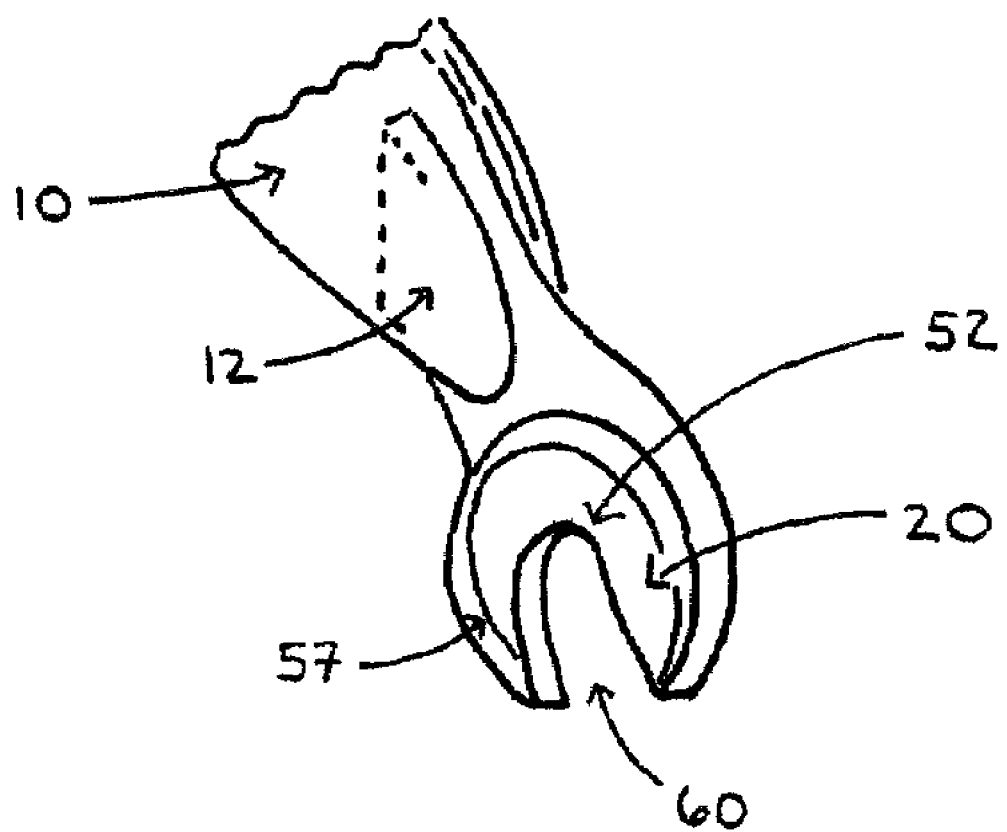
FIG. 1 is a depiction of a typical drop-out of a bicycle.
Figure 2:
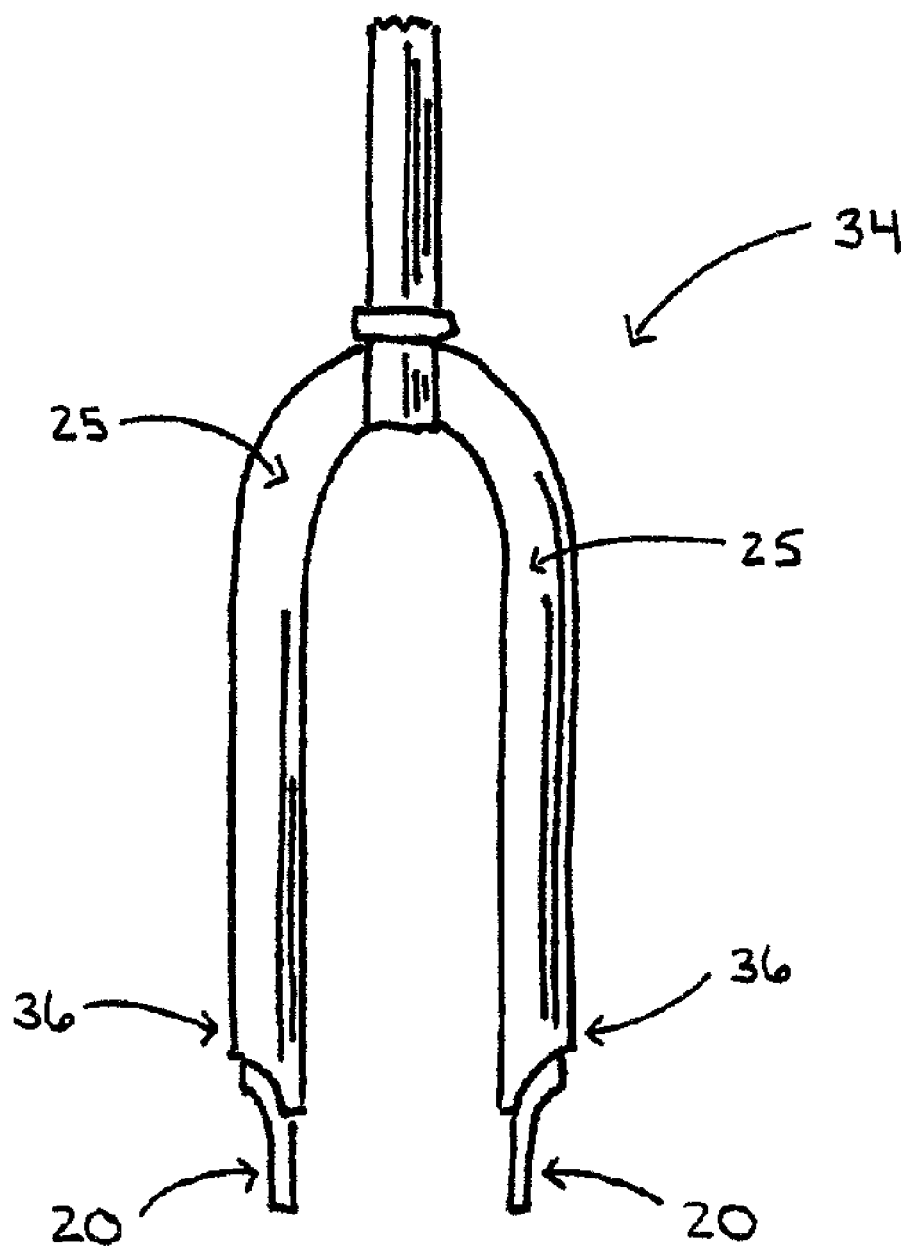
FIG. 2 is an illustration of a front view of a typical bicycle front fork with drop-outs.
Figure 3:
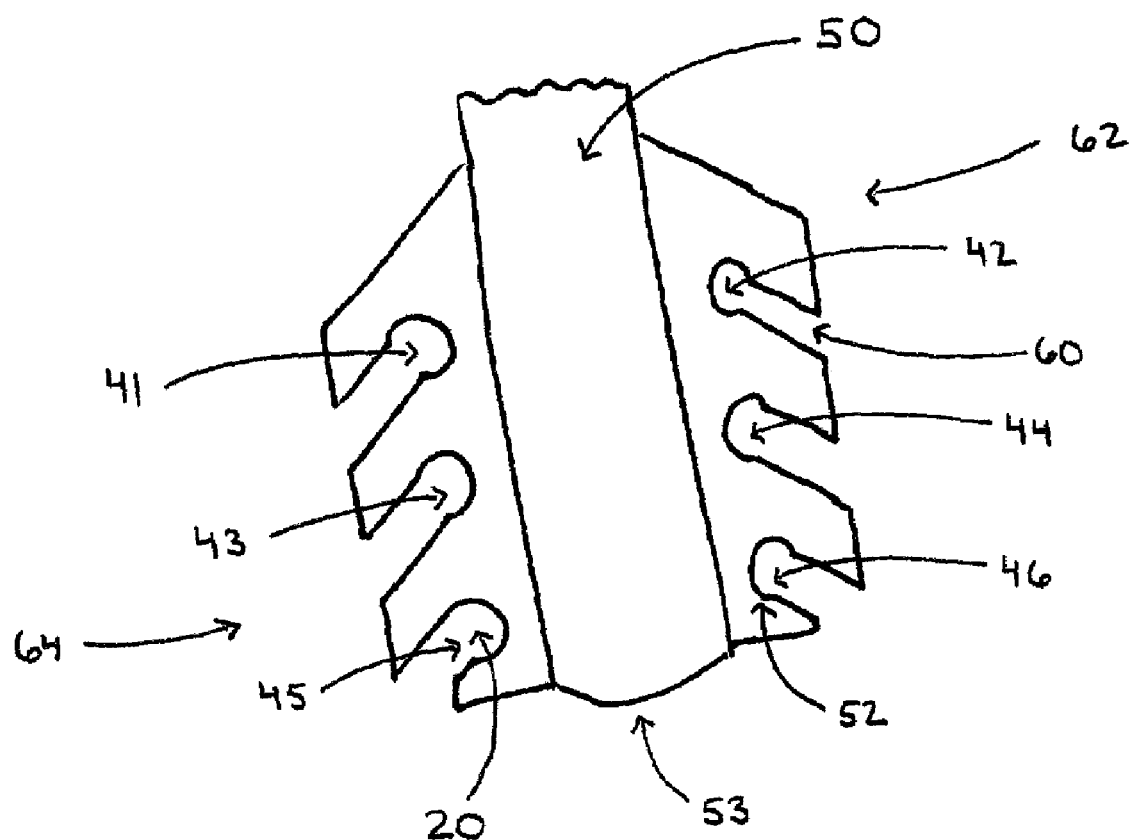
FIG. 3 is a side view of a drop-out bracket device according to exemplary embodiments of the present invention.

As illustrated in FIG. 3, the drop-out bracket device 40 of the present invention comprises a tubular member 50 having at least two drop-outs 20. The at least two drop outs may be positioned on a front side 62 of the tubular member, a back side 64 of the tubular member, or a combination thereof.

Although the tubular member is shown as having a substantially circular or oval cross-section, the tubular member cross section may be of any geometrical shape.

Each drop-out comprises a substantially planar fastening member 52 and, preferably, a slot or opening 60.

The dropouts 20 are disposed at the distal end of the furcations 25, and may be either of tab tip design, or may be of the design known as the reversed dropout. In a preferred embodiments of the present invention, a redundant safety feature is built into the dropout 20. The typical stock dropout includes a washer that is usually thrown away by the bicycle owner. In the dropout 20 of the present invention, the washer may be built into the fork so that it cannot be thrown away. Preferably, a slot 60 receives an axle 38 of the bicycle wheel. The dropout 20 may be provided with raised lips (not shown) to retain the wheel retainers (not shown).

The slot 60, allows for easier changing of a wheel's position; however, the slot is not required, and the drop-out may include merely a hole for acceptance of the axle and associated accessories.

Figure 4:
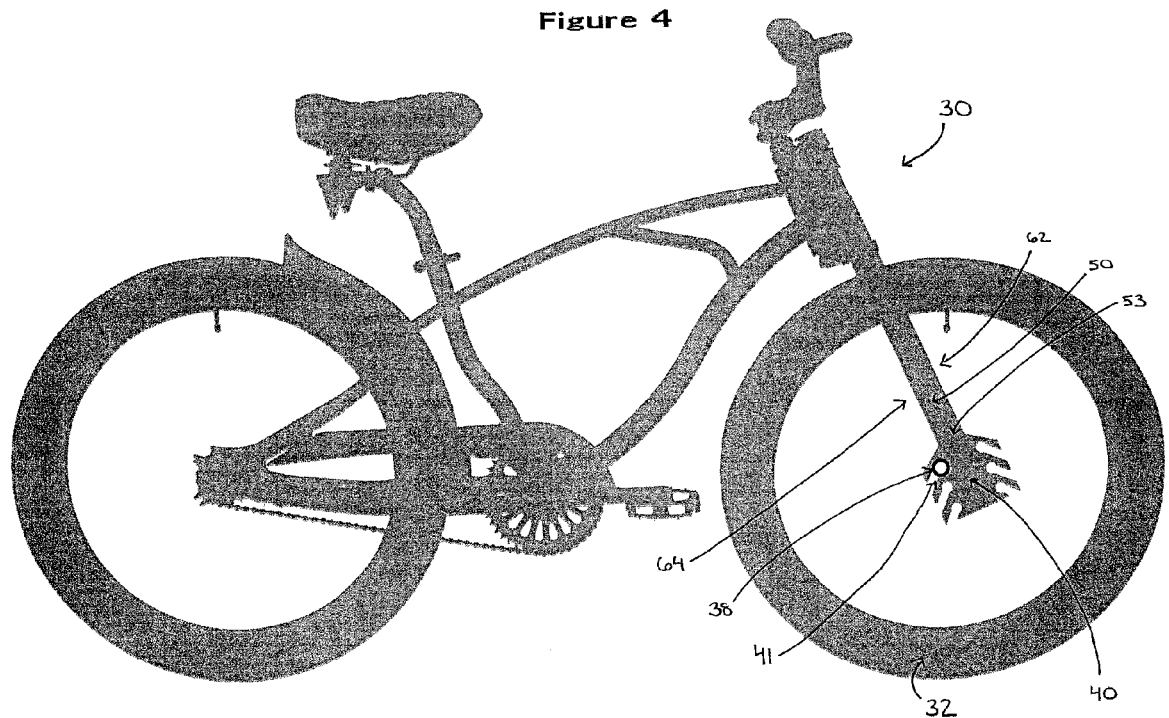
FIG. 4 is an illustration of a side view of a bicycle having a drop-out bracket device according to an exemplary embodiment of the present invention.

Referring to FIG. 4, there is shown a bicycle 30 incorporating the drop-out bracket device according to the various exemplary embodiments of the present invention. FIG. 4 is a side view of the bicycle having a front wheel 32 of the bicycle fixed to the drop-out bracket device 40 at a first position 41, that is, at the first drop-out of the drop-out bracket device having multiple drop-outs.

Although FIG. 4 shows only a single drop-out bracket 40, it should be understood that at least two such bracket devices coexist on each side of a single wheel as shown in FIG. 4. Thus, it is preferred that each of the coexisting drop-out bracket devices are substantially level and parallel with one another such that the axle 38 of the wheel 32 is attached to the same position in each coexisting drop-out bracket device.

Figure 5:
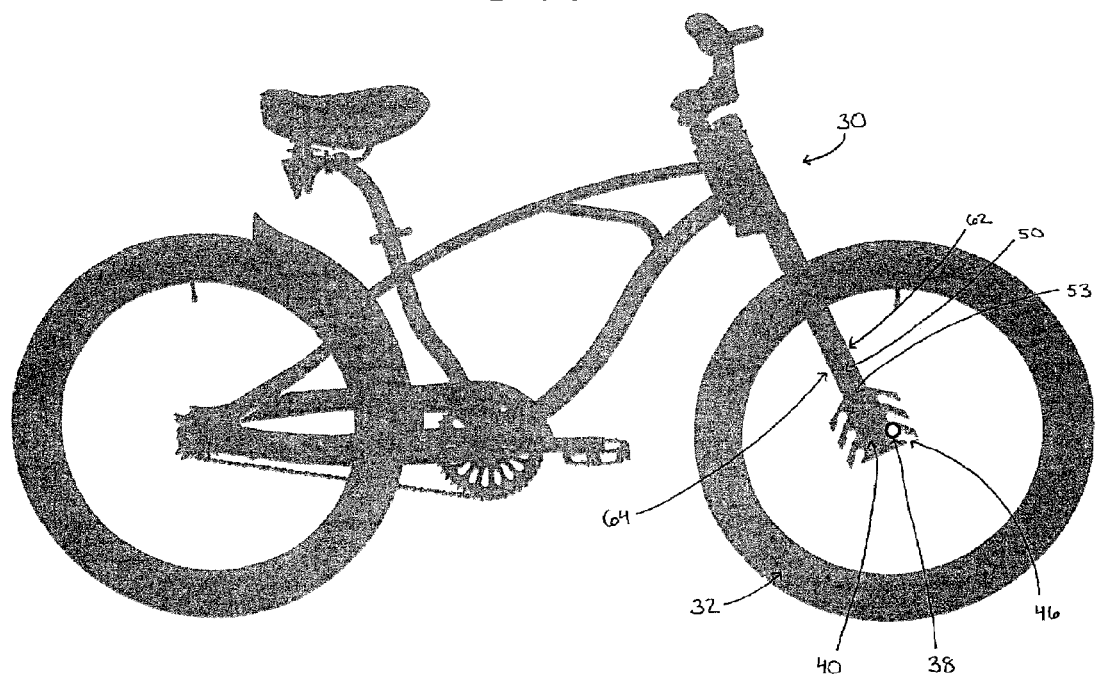
FIG. 5 is an illustration of the bicycle in FIG. 4, but with the front wheel positioned in a different drop-out of the drop-out bracket device.

FIG. 5 illustrates a bicycle similar to that shown in FIG. 4; however, in FIG. 5 the front wheel 32 of the bicycle is fixed to the drop-out bracket device 40 at a sixth position 46, that is, at the sixth drop-out of the drop-out bracket device having multiple drop-outs.

Typical cycles comprise at least two furcations to retain and steady the cycle's wheels. However, some cycles, including motorcycles, for example, comprise merely a single arm or furcation to retain and steady a wheel. Thus, the wheel is retained and steadied by only one drop-out rather than two drop-outs as shown in the above figures. The various exemplary embodiments of the present invention comprise retaining a wheel of a cycle with on one drop-out bracket device where there is only one arm or furcation retaining and steadying a wheel.

In a preferred embodiment illustrated in FIG. 3, the drop-out bracket device 40 comprises three drop-outs on the front side of the device and three drop-outs on the backside of the device. Thus, a wheel may be positioned in six different locations on the front fork of the cycle; a first position 41, a second position 42, a third position 43, a fourth position 44, a fifth position 45, and a sixth position 46.

Each of the positions has varying riding characteristics that may be more desirable to different individuals.

For example, setting the wheel in the first position 41 allows for a ride with a very sharp steering response. Setting the wheel in the second or third position 42, 43 allows for varying degrees of steadier riding with quick steering. The fourth and fifth positions 44, 45 allow for varying degrees of more stable riding and mellower steering capability. Finally, the sixth position 46 provides a very stable ride and with the slowest steering capabilities.

In addition to the drop-outs on the front side 62 and back side 64 of the tubular member 50, a drop out may be positioned in the traditional position at the distal end 53 of the tubular member.

Although the above example describes a drop-out bracket device comprising a total of six drop-outs evenly dispersed on the front and back of the tubular member attached to the cycle's front fork, other combinations of positions, distribution, and numbers of drop-outs between the front and back of the tubular members are contemplated.

Further, it should be noted that the drop-out bracket device may also be designed for the rear of a cycle.

In addition, it should be noted that the present invention is not limited to pedal-powered cycles as illustrated in the figures. The present invention may be utilized on motor-powered cycles as well. Typically, in motor-powered cycles the drop-out comprises an opening that is a surrounded hole in the substantially planar fastening member, as this better retains the heavier weight associated with a motor powered cycle. Nonetheless, the present invention may be used on pedal or motor-powered cycles.

The drop-out bracket device may be comprised of any desired cycle material, such as, for example, steel, aluminum, titanium, carbon fiber, metal reinforced plastic, metal alloy, or a combination thereof.

It is also preferred that the drop-out bracket device is a single piece. However, each drop-out could be individually manufactured and affixed to the tubular member.

It is preferred that the drop-out bracket device be attached to the furcations of the cycle by, for example, welding, bonding, press fitting, or any other known means of attachment.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A front fork assembly for a cycle having at least two wheels, the assembly comprising:
   a steering tube;
   front furcations fixed to the steering tube; and
   a drop-out bracket device fixed to a distal end of each front furcation, the drop-out bracket device comprising a tubular member having at least two drop-outs directed towards a front side of the cycle, a back side of the cycle, or a combination of both, wherein each drop-out comprises a substantially planar fastening member and an opening.

2. The front fork assembly according to claim 1, wherein the drop-out bracket device comprises at least three drop-outs directed towards the front side of the cycle.

3. The front fork assembly according to claim 1, wherein the drop-out bracket device comprises at least three drop-outs directed towards the back side of the cycle.

4. The front fork assembly according to claim 1, wherein the drop-out bracket device further comprises a drop-out bracket at a distal end of the device.

5. The front fork assembly according to claim 1, each drop-out further comprises a raised lip.

6. The front fork assembly according to claim 1, wherein a cross section of the tubular members is substantially circular or oval.

7. A drop-out bracket device for retaining an axle of a multi-wheeled cycle, wherein the drop-out bracket device comprises a tubular member having at least two drop-outs directed towards a front side of the cycle, a back side of the cycle, or a combination of both, wherein each drop-out comprises a substantially planar fastening member and an opening.

8. The drop-out bracket device according to claim 7, comprising at least three drop-outs directed towards the front side of the cycle.

9. The drop-out bracket device according to claim 7, comprising at least three drop-outs directed towards the back side of the cycle.

10. The drop-out bracket device according to claim 7, further comprising a drop-out bracket at a distal end of the device.

11. The drop-out bracket device according to claim 7, wherein each drop-out further comprises a raised lip.

12. The drop-out bracket device according to claim 7, wherein a cross section of the tubular members is substantially circular or oval.

13. The drop-out bracket device according to claim 7, wherein the drop-out bracket supports a front axle of the cycle.

14. The drop-out bracket device according to claim 7, wherein the drop-out bracket supports a rear axle of the cycle.

15. The drop-out bracket device according to claim 7, wherein there is only one drop-out bracket supporting a front axle of the cycle, a rear axle of the cycle, or both.

16. The drop-out bracket device according to claim 7, wherein the cycle is pedal-powered.

17. The drop-out bracket device according to claim 7, wherein the cycle is motor-powered.

18. A method of altering the performance of a multi-wheeled cycle, comprising:
   attaching a drop-out bracket device for retaining an axle of a multi-wheeled cycle, wherein the drop-out bracket device comprises a tubular member having at least two drop-outs directed towards a front side of the cycle, a back side of the cycle, or a combination of both, wherein each drop-out comprises a substantially planar fastening member and an opening;
   retaining the axle in one of the drop-outs of the drop-out bracket device;
   releasing the axle from one of the drop-outs of the drop-out bracket device and retaining the axle in another of the drop-outs of the drop-out bracket devices.

* * * * *